(12) United States Patent
Abbondanzio et al.

(10) Patent No.: US 10,616,205 B2
(45) Date of Patent: Apr. 7, 2020

(54) NON-NETWORKING CONNECTION WITH SERVER COMPUTING DEVICE TO AT LEAST POWER OFF THE SERVER COMPUTING DEVICE

(71) Applicant: Lenovo Enterprise Solutions (Singapore) PTE. LTD., New Tech Park (SG)

(72) Inventors: Antonio Abbondanzio, Raleigh, NC (US); Gregory B. Pruett, Morrisville, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 461 days.

(21) Appl. No.: 14/811,349

(22) Filed: Jul. 28, 2015

(65) Prior Publication Data
US 2017/0034154 A1 Feb. 2, 2017

(51) Int. Cl.
*H04L 29/06* (2006.01)
*G06F 21/30* (2013.01)
(Continued)

(52) U.S. Cl.
CPC ........ *H04L 63/0823* (2013.01); *G06F 21/305* (2013.01); *G06F 21/33* (2013.01); *H04W 12/06* (2013.01)

(58) Field of Classification Search
CPC ... H04L 63/0823; G06F 21/305; G06F 21/33; H04W 12/06
See application file for complete search history.

(56) References Cited

U.S. PATENT DOCUMENTS

| 9,684,630 B1* | 6/2017 | Marr ..................... G06F 15/177 |
| 2007/0027981 A1* | 2/2007 | Coglitore ............ H04L 43/0817 709/224 |

(Continued)

OTHER PUBLICATIONS

Intelligent Platform Management Interface Specification Second Generation v2.0, Oct. 1, 2013, Intel/Hewlett-Packard/NEC/Dell, pp. 1-3, 384-391, 587-589, obtained from https://www.intel.com/content/www/us/en/servers/ipmi/ipmi-second-gen-interface-spec-v2-rev1-1.html.*

*Primary Examiner* — Alexander Lagor
*Assistant Examiner* — Forrest L Carey
(74) *Attorney, Agent, or Firm* — Kunzler Bean & Adamson, PC; Bruce R. Needham

(57) ABSTRACT

A mobile computing device of a user transmits a digital certificate to a server computing device over a non-networking connection established with the server computing device. The digital certificate identifies the user, a particular server computing device, a validity period in which the digital certificate is valid, and a list of actions that the user is permitted to perform on the particular server computing device during the validity period. The server computing device authenticates the digital certificate, such as by determining whether a current time is within the validity period and whether the particular server computing device is the server computing device. When authentication is successful, the user can perform any action of the list of actions, including an action to power off the service computing device. The non-networking connection is such that the user is not provided a user account and a password to access the server computing device.

15 Claims, 3 Drawing Sheets

(51) Int. Cl.
*H04W 12/06* (2009.01)
*G06F 21/33* (2013.01)

(56) References Cited

U.S. PATENT DOCUMENTS

| | | | |
|---|---|---|---|
| 2014/0101439 A1* | 4/2014 | Pettigrew | H04L 63/0823 713/156 |
| 2014/0280934 A1* | 9/2014 | Reagan | H04L 47/70 709/225 |
| 2015/0271130 A1* | 9/2015 | McCallum | H04L 41/0806 709/223 |
| 2016/0295349 A1* | 10/2016 | George | H04W 4/008 |

\* cited by examiner

NON-NETWORKING CONNECTION WITH SERVER COMPUTING DEVICE TO AT LEAST POWER OFF THE SERVER COMPUTING DEVICE

BACKGROUND

Server computing devices, which are commonly referred to as servers, are computing devices accessible over a network, and that can store large amounts of data accessed by many users and/or perform processing for many users. For example, a web server is a server computing device that is typically connected to the Internet to host one or more web sites for users across the globe to access. As such, but for maintenance, server computing devices are generally on all the time, twenty-four hours a day, seven days a week. Server computing devices therefore differ from personal computing devices, like desktop and laptop computers, which are typically used by individual users, and which are often turned off.

SUMMARY OF THE INVENTION

An example non-transitory computer-readable medium stores a computer program executable by a mobile computing device to perform a method. The method includes receiving a digital certificate identifying a user of the mobile computing device, a server computing device, a validity period in which the digital certificate is valid, and a list of actions that the user is permitted to perform on the server computing device during the validity period. The method includes establishing a non-networking connection with the server computing device during the validity period. The method includes transmitting the digital certificate to the server computing device via the non-networking connection. The method includes, after the server computing device has authenticated the digital certificate, displaying the list of actions to the user. The list of actions includes an action to power off the server computing device.

An example method includes creating, at a computing device, a digital certificate identifying a user of a mobile computing device, a server computing device, a validity period in which the digital certificate is valid, and a list of actions that the user is permitted to perform on the server computing device during the validity period. The list of actions includes an action to power off the server computing device. The method includes transmitting, from the computing device to the mobile computing device, the digital certificate. The mobile computing device subsequently establishes a non-networking connection with the server computing device during the validity period by which to transmit the digital certificate to and then permit the user to perform any of the list of actions on the server computing device.

An example server computing device includes networking communication hardware to permit users having user accounts and associated passwords to log onto the server computing device over a network. The server computing device includes non-networking communication hardware to permit a technician to establish a non-networking connection with the server computing device. The technician does not have a user account nor an associated password to log onto the server computing device over the network. The server computing device includes a service processor, and a memory to store logic executable by the service processor. The logic is executable by the service processor to receive a request from the technician over the non-networking connection. The request includes authentication information of the technician. The logic is executable by the service processor to authenticate the technician using the authentication information. The logic is executable by the service processor to, when authentication is successful, permit the technician to perform any of a list of actions associated with the authentication information on the server computing device. The list of actions includes an action to power off the server computing device. The logic is executable by the service processor to, when authentication is unsuccessful, prohibit the technician from performing any action on the server computing device over the non-networking connection.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
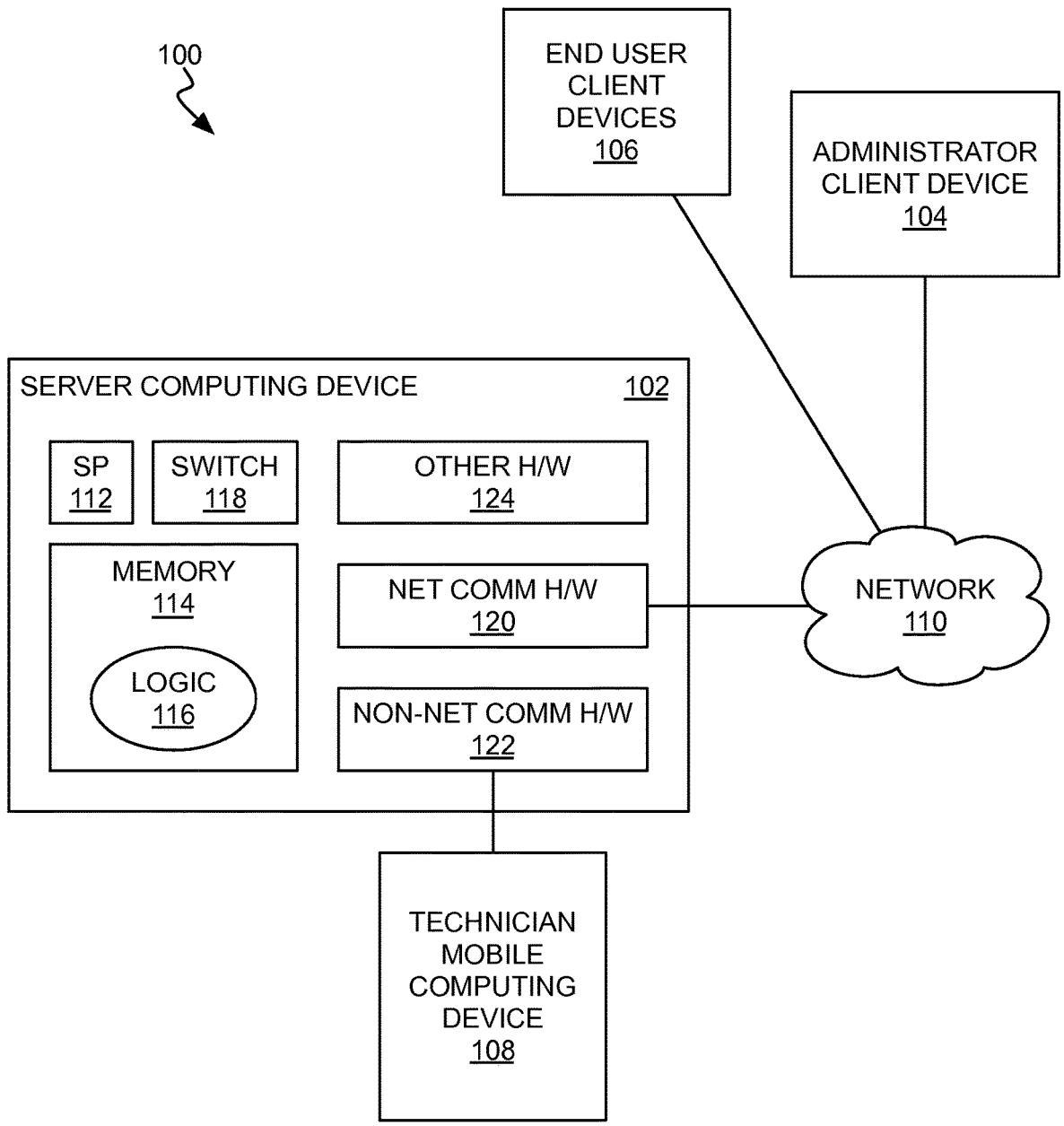
FIG. 1 is a diagram of an example system in which a user of a mobile computing device can turn off a server computing device without having user credentials to the server.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background, server computing devices are usually on all the time, except when they require maintenance. For example, a server computing device may be powered off so that an internal component thereof can be upgraded or replaced. Server computing devices are further commonly installed in server rooms and other locations in which many such servers are housed. For example, a server computing device may be installed along with a number of other such servers in one of a number of racks.

Because so many server computing devices can be commonly located, and because the server computing devices may appear outwardly identical, confusion can occur when determining which particular server to turn off for maintenance purposes. Powering off the wrong server computing device can result in potentially disastrous consequences. Many server computing devices provide mission critical processing and data storage, and prematurely turning a server off before it has been shut down in an orderly fashion can result in downtime to users, or even data loss.

To ensure that server computing devices are not accidentally turned off, their power switches are commonly disabled. As such, pressing the power button for a server computing device usually has no effect. When a server is to receive maintenance, the power button may be temporarily enabled so that a technician can turn off the server using the button. However, temporary enablement of the power button can be disadvantageous, because when the power button for a server computing device is temporarily enabled, the server may be accidentally powered down before it should be.

Another way to permit a technician to turn off a server computing device is to temporarily provide the technician with a user account and password for the server. The technician thus logs onto the server over a network, and initiates a shutdown command at the server. The server in turn shuts down in an orderly fashion and powers off. However, providing even temporary credentials for a technician to access a server computing device over a network can present a security risk, and organizations may have policies in place prohibiting such granting of server access over a network.

Techniques disclosed herein provide a safe way by which server computing devices can be powered off by technicians without temporarily enabling their power switches and without giving the technicians credentials to access the servers over a network. A digital certificate identifying the technician, the server computing device in question, a validity period in which the certificate is valid, and a list of actions that the technician is permitted to perform in relation to the server (such as powering it off) is created and transmitted to a mobile computing device of the technician, such as a smartphone. The technician establishes a non-networking connection between his or her mobile computing device and the server, such as a wireless Bluetooth or near-field communication (NFC) connection, or a wired universal serial bus (USB) connection. The server authenticates the digital certificate, and subsequently permits the technician to perform any action selected from the permitted list in relation to the server.

Accidental turning off of the wrong server computing device is prevented, because if the technician identifies the wrong server to which to transmit the digital certificate, such a server will not successfully authenticate the certificate. Accidental turning off of the correct server computing device is also prevented, because the server's power switched can remain disabled and thus have no effect when actuated. Network security is further maintained, because the technician is not provided with a user account and password, even temporarily, to access the server over a network.

FIG. 1 shows an example system 100. The system 100 includes a server computing device 102, an administrator client device 104, and end user client devices 106, which are communicatively interconnected to one another via a network 110. The client devices 104 and 106 may be computing devices like laptop computers and desktop computers, for instance. The end user of each client device 106 has a user account and associated password to access the server computing device 102 over the network 110, as does the server or network administrator of the client device 104. The administrator of the client device 104 further can add, remove, and update the user accounts. The network 110 may a wired or a wireless network, the Internet, an intranet, an extranet, and/or a local area network, among other types of networks.

The system 100 also includes a technician mobile computing device 108. The mobile computing device 108 may be a smartphone, a laptop computer, or another type of mobile computing device. The technician or other user of the mobile computing device 108 may not have a user account and associated password to access the server computing device 102. As such, this user may not be able to access the server computing device 102 over the network 110. The technician can be a professional that has to turn off the server computing device 102 to service the server 102, such as to upgrade or replace various hardware components thereof. The technician may be a different user than the administrator of the network 110 and/or of the server 102 itself.

The server computing device 102 includes a service processor 112, a memory 114 storing logic 116, a power switch 118, networking communication hardware 120, non-networking communication hardware 122, as well as other hardware 124. The service processor 112 is a separate, dedicated internal processor of the server computing device 102, and operates independently of the central processing unit (CPU) of the server 102, which is part of the other hardware 124. The service processor 112 operates even if the CPU or the operating system of the server computing device 102 is locked up or otherwise inaccessible. The service processor 112 thus permits the server computing device 102 to be administered in such situations.

The memory 114 may be non-volatile semiconductor memory, such that the logic 116 may be firmware like a basic input/output system (BIOS). The service processor 112 executes the logic 116 from the memory 114. The logic 116 is a computer program, and the memory 114 is a computer-readable medium. The power switch 118 turns on or off the server computing device 102 when actuated. The power switch 118 can be disabled, so that actuating the switch 118 does not turn on or off the server 102. For instance, the power switch 118 may not be directly connected to the power source of the server 102, such as the connection of the server 102 to an alternating current (AC) mains. Rather, the power switch 118 may be a "soft" switch. Actuation of the power switch 118 is detected by the service processor 112, such as in the form of an interrupt, and in response to such actuation, the processor 112 may gracefully shut down the server 102 by, for instance, causing the operating system running thereon to shut down, and thereafter powering off the server 102.

The networking communication hardware 102 may be an Ethernet adapter or other type of networking communication hardware by which the server computing device 102 is communicatively connected to the network 110. By comparison, the non-networking communication hardware 102 is communication hardware that does not connect the server computing device 102 to a network like the network 110. For example, the non-networking communication hardware 102 may be a USB port or another type of wired hardware. As another example, the non-networking communication hardware 102 may be a Bluetooth transceiver, an NFC transceiver, or another type of wireless hardware. The mobile computing device 108 can be communicatively connected to the server computing device 102 via the non-networking communication hardware 122, to establish a non-networking connection with the server 102, even when the technician or other user of the device 108 does not have a user account and password for logging onto the server 102 over the network 110.

Figure 2:
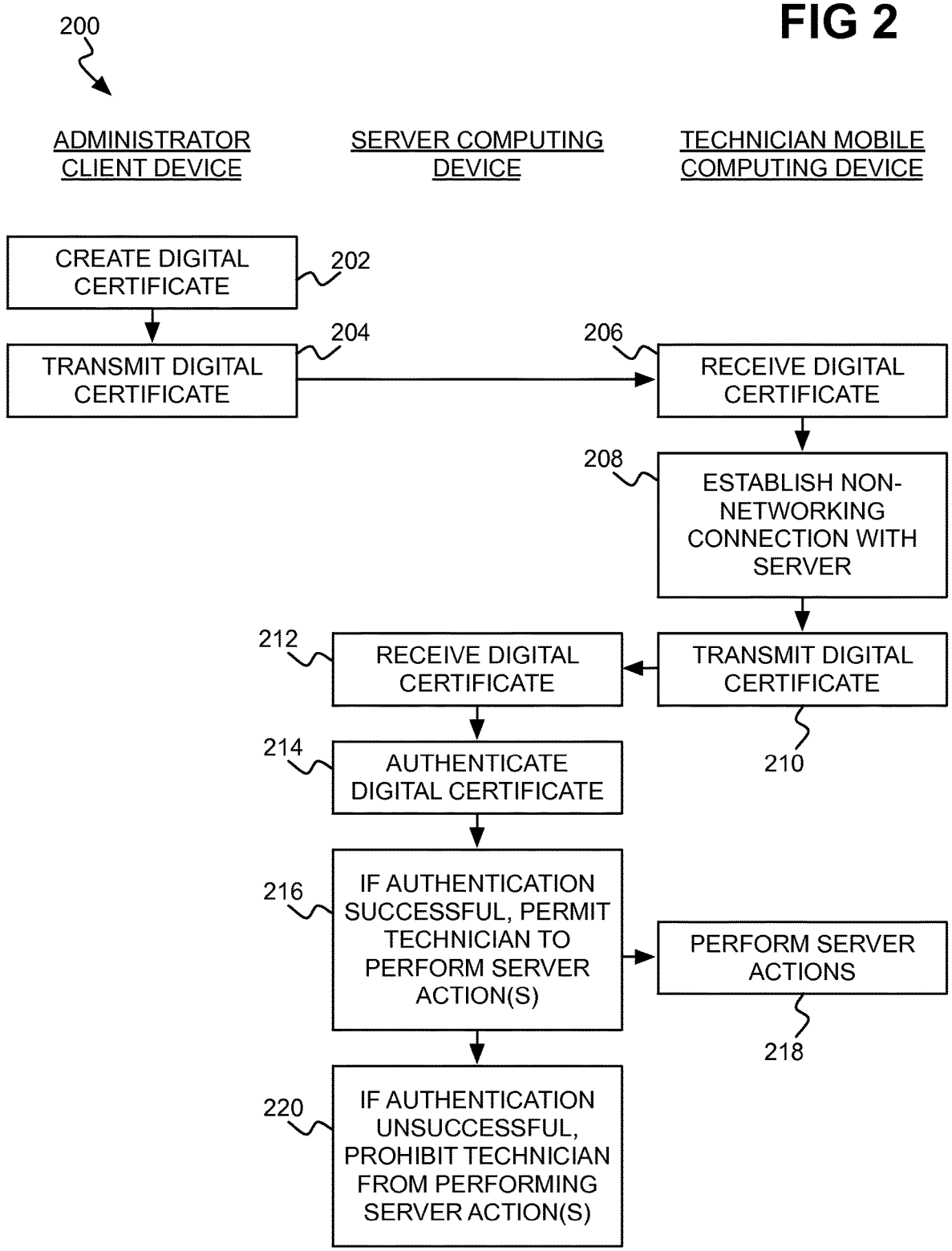
FIG. 2 is a flowchart of a method showing how a user of a mobile computing device can turn off a server computing device without having user credentials to the server.

FIG. 2 shows an example method 200. The method 200 is divided over three columns. Parts of the method 200 in the left column are performed by or at the administrator client device 104. Parts of the method 200 in the middle column are performed by or at the server computing device 102, such as by the service processor 112 thereof. Parts of the method in the right column are performed by or at the technician mobile computing device 108.

The administrator creates a digital certificate (202). A digital certificate generally is a digital document used for security purposes, and can include a public cryptographic key that corresponds to a private cryptographic key. The digital certificate created in part 202 identifies the technician or other user of the mobile computing device 108, the server computing device 102, a validity period, and a list of actions. The validity period is the starting time and the ending time in which the digital certificate is valid. The list of actions includes one or more actions that the technician is permitted to perform on the server computing device 102 during the validity period. It is noted that part 202 can be preceded by the administrator client device 104 receiving the identification of the technician, the identification of the server 102, the validity period, and the list of permitted actions from the administrator.

The administrator client device 104 transmits the digital certificate that has been created to the technician mobile computing device 108 (204), which receives the certificate (206). For example, the digital certificate may be transmitted via email, text message, or in another manner. The technician establishes a non-networking connection between his or her mobile computing device 108 and the server computing device 102 (208). It is noted that this non-networking connection is established such that, and in that, the technician is not provided a user account and password to access the server 102.

In the case of a wired connection, the technician can use a cable like a USB cable to connect the devices 102 and 108 together. In the case of a wireless NFC connection, the technician may just have to position the mobile computing device 108 in close proximity to the server computing device 102 to cause the NFC connection to be automatically established. In the case of a wireless Bluetooth connection, the technician may first position the mobile computing device 108 near the server computing device 102, and then select an option on the device 108 to connect to the server 102.

Once the non-networking connection has been established between the mobile computing device 108 and the server computing device 102, the technician causes the device 108 to send the previously received digital certificate to the server 102 (210), which receives the certificate (212). For example, the technician may use a computer program on his or her mobile computing device 108, such as what is referred to as an "app" in the case of a smartphone, to perform this functionality. When the technician opens the email or text message, for instance, that includes the digital certificate transmitted in part 204, selecting the digital certificate may cause this app to be opened to store the certificate. The technician can then select the digital certificate within the app to transmit the certificate over the non-networking connection to the server computing device 102. The digital certificate can be considered authentication information that the server 102 receives from the mobile computing device 108. The transmission of the digital certificate in part 210 can be considered a request sent by the technician to the server computing device 102.

The server computing device 102 authenticates the digital certificate (214). Authentication can include verifying the public key of the digital certificate against a certificate authority (CA) to ensure that the holder of the certificate (the technician) is who he or she claims to be. The CA is an entity that maintains a computing device with which the server computing device 102 can communicate to perform this verification. Authentication can also include verifying that the current time is within the validity period, and verifying that the server identified within the digital certificate is actually the server computing device 102.

If authentication is successful, then the server computing device 102 permits the technician to perform any action of the list of actions included within the digital certificate in relation to the server 102 (216). As such, the technician can perform any of the list of actions (218). For example, the app on the mobile computing device 108 may display the list of actions, from which the technician can select a desired action or actions to perform in relation to the server computing device 102. When the technician selects a particular action, the mobile computing device 108 communicates or transmits the action to the server computing device 102, which then effectuates the action.

By comparison, if authentication is unsuccessful, then the server computing device 102 prohibits the technician from performing any action in relation to the server 102 (220). Authentication may fail for a number of different reasons. First, the digital certificate itself may be invalid; that is, the CA may not successfully verify that the holder of the certificate is who he or she claims to be. Second, the server identified in the digital certificate may not be the server computing device 102. Third, the digital certificate may have expired or may have yet to become valid; that is, the current time may be outside the validity period specified in the digital certificate.

The technician or other user of the mobile computing device 108 thus can perform actions in relation to the server computing device 102, including an action to power off the server 102, even though the technician does not have credentials like a user account and password to access the server 102 over the network 110. The technician can power off the server 102 via an action transmitted over the non-networking connection instead. The technician can power off the server 102 even if the administrator of the server computing device 102 has disabled the power switch 118 of the server 102.

The method 200 permits the administrator to specify with granularity which actions the technician is permitted to perform on the server computing device 102 when creating the digital certificate in part 202. For example, the technician may just be permitted to turn off the server 102. The technician may also be permitted to disable various hardware components of the other hardware 124 of the server 102, for instance. The technician may further be permitted to perform software-oriented actions on the server 102, such as shutting down various processes running on the server 102, terminating active user sessions or logons of the server 102, and so on.

Furthermore, the server computing device 102 may log the actions performed by the technician on the server 102 in part 218. Such logging can include the identity of the technician, the action that has been performed, and when the action was performed. This information can be useful for audit and other purposes, and may be stored or transmitted by the server 102 for later access by the administrator, for instance.

Figure 3:
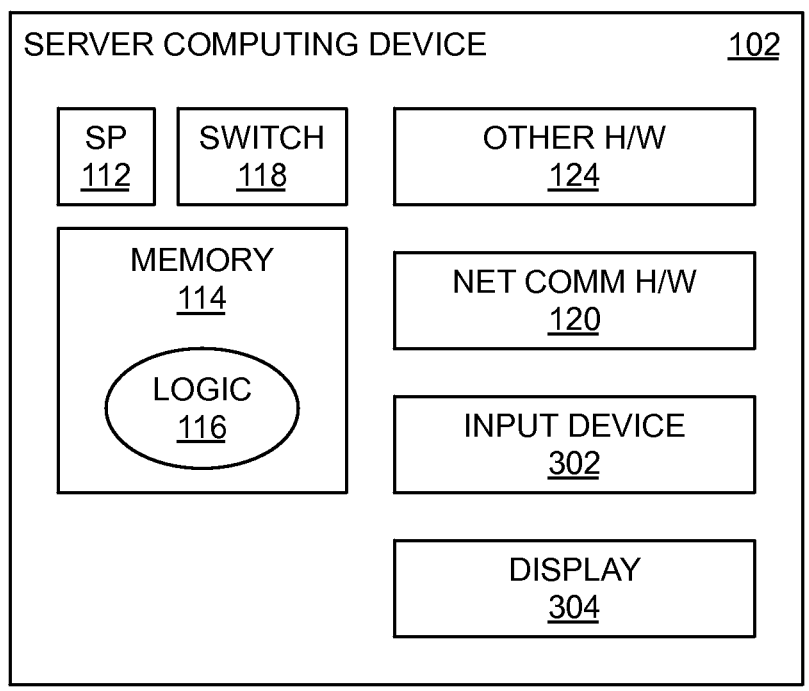
FIG. 3 is a diagram of an example server computing device in which a user can turn off the server by using a personal-identification number (PIN) code.

FIG. 3 shows the server computing device 102 according to a different example implementation. The server computing device 102 includes a service processor 102, a memory 114 storing logic 116, a power switch 118, networking communication hardware 120, and other hardware 124, as has been described. The server computing device 102 in the implementation of FIG. 3 also includes an input device 302 and a display 304, in addition to and/or in lieu of the non-networking communication hardware 122 of FIG. 1 that has been described. For example, the input device 302 and the display 304 may be integrated as a touchscreen. As another example, the input device 302 may be a numerical keypad having separate keys, and the display 304 may be a liquid crystal display (LCD), or another type of display.

In the implementation of FIG. 3, the authentication information can be a personal identification number (PIN) code instead of a digital certificate. The administrator thus creates a PIN code for a technician, and transmits the PIN code to the technician, such as via email or text message, as well as to the server computing device 102 via the administrator client device 104. The administrator may set a validity period of the PIN code, which is transmitted to the server 102 along with the code, and also specifies a list of actions that successfully entry of the PIN code permits the technician to perform in relation to the server computing device 102.

The technician enters the PIN code using the input device 302, as prompted by the server 102 on the display 304. Entry of the PIN code may be a considered a request sent by the technician to the server 102. The server computing device 102 then authenticates the PIN code, by verifying that the PIN code corresponds to a PIN code that it previously received from the administrator client device 104, and that at the time the PIN code was entered the code is still valid (i.e., the current time is within the validity period). If authentication is successful, the technician can perform on the server 102 any action of a list of actions that the administrator has associated with PIN code. If authentication is unsuccessful, the technician is prohibited from performing actions in relation to the server 102.

The techniques disclosed herein thus permit a technician to perform actions on a server computing device 102 without having to have networking user credentials with the server 102. Accidental powering off of the wrong server is prevented, because authentication information is tied to a particular server. Network security is maintained, because a user account and password does not have to be provided to the technician. Accidental powering off of the correct server but at the wrong time is also prevented, because a validity period in which the authentication information permits actions to be performed on the server can be specified.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A non-transitory computer-readable medium storing a computer program executable by a mobile computing device to perform a method comprising:

responsive to a server computing device that requires maintenance, that has a disabled power switch, and with which a user of the mobile computing device does not have and is not permitted to have credentialed network access permitting access to the server computing device over a specific network, receiving a digital certificate identifying the user of the mobile computing device, the server computing device, a validity period in which the digital certificate is valid, and a list of actions that the user is permitted to perform on the server computing device in accordance with the maintenance during the validity period;

while the mobile computing device is physically proximate to the server computing device sufficient to establish a non-networking connection that does not require the credentialed network access, establishing the non-networking connection with the server computing device during the validity period;

transmitting the digital certificate to the server computing device via the non-networking connection; and after the server computing device has authenticated the digital certificate, displaying the list of actions to the user, the list of actions comprising an action to power off the server computing device;

receiving a selected action of the list of actions from the user; and transmitting the selected action to the server computing device for the server computing device to perform in accordance with the maintenance, wherein the server computing device is one of a plurality of server computing devices located within a same server rack and that have disabled power switches to prevent the user from accidentally powering off an incorrect server computing device when the server computing device requires maintenance, wherein the method maintains security of the server computing device when the server computing device requires the maintenance by the user, by permitting the mobile computing device of the user access to the server computing device when the user has direct physical access to the server computing device and the mobile computing device is physically proximate to the server computing device sufficient to establish the non-networking connection, without providing the credentialed network access to the server computing device without having to temporarily enable the power switch thereof, preventing accidental turning off of the incorrect server computing device while also maintaining network security.

2. The non-transitory computer-readable medium of claim 1, wherein the digital certificate is pre-created by an administrator of the server computing device, the administrator being different than the user of the mobile computing device.

3. The non-transitory computer-readable medium of claim 1, wherein the non-networking connection is one of:
a Bluetooth wireless connection;
a near-field communications (NFC) wireless connection;
a universal serial bus (USB) wired connection.

4. The non-transitory computer-readable medium of claim 1, wherein the non-networking connection is established such that and in that the user is not provided a user account and a password to access the server computing device.

5. The non-transitory computer-readable medium of claim 1, wherein the action to power off the server computing device permits the user to power off the server computing device even when the power switch of the server computing device has been disabled.

6. A method comprising:

responsive to a server computing device requiring maintenance and that has a disabled power switch, and with which a user of a mobile computing device does not have and is not permitted to have credentialed network access permitting access to the server computing device over a specific network, receiving, by the mobile computing device, a digital certificate identifying the user of the mobile computing device, the server computing device, a validity period in which the digital certificate is valid, and a list of actions that the user is permitted to perform on the server computing device in accordance with the maintenance during the validity period;

while the mobile computing device is physically proximate to the server computing device sufficient to establish a non-networking connection that does not require the credentialed network access, establishing, by the mobile computing device, the non-networking connection with the server computing device during the validity period;

transmitting, by the mobile computing device, the digital certificate to the server computing device via the non-networking connection; and after the server computing device has authenticated the digital certificate, displaying, by the mobile computing device, the list of actions to the user, the list of actions comprising an action to power off the server computing device;

receiving, by the mobile computing device, a selected action of the list of actions from the user; and transmitting, by the mobile computing device, the selected action to the server computing device for the server computing device to perform in accordance with the maintenance, wherein the server computing device is one of a plurality of server computing devices located within a same server rack and that have disabled power switches to prevent the user from accidentally powering off an incorrect server computing device when the server computing device requires maintenance, wherein the method maintains security of the server computing device when the server computing device requires the maintenance by the user, by permitting the mobile computing device of the user access to the server computing device when the user has direct physical access to the server computing device and the mobile computing device is physically proximate to the server computing device sufficient to establish the non-networking connection, without providing the credentialed network access to the server computing device without having to temporarily enable the power switch thereof, preventing accidental turning off of the incorrect server computing device while also maintaining network security.

7. The method of claim 6, wherein the digital certificate is pre-created by an administrator of the server computing device, the administrator being different than the user of the mobile computing device.

8. The method claim 6, wherein the non-networking connection is one of:
a Bluetooth wireless connection;
a near-field communications (NFC) wireless connection;
a universal serial bus (USB) wired connection.

9. The method claim 6, wherein the non-networking connection is established such that and in that the user is not provided a user account and a password to access the server computing device.

10. The method claim 6, wherein the action to power off the server computing device permits the user to power off the server computing device even when the power switch of the server computing device has been disabled.

11. A mobile computing device comprising:
a non-networking connection to communicatively connect to a server computing device;
a processor;
a non-transitory computer-readable data storage medium storing instructions that the processor is to execute to perform processing comprising:

responsive to the server computing device requiring maintenance and that has a disabled power switch, and with which a user of a mobile computing device does not have and is not permitted to have credentialed network access permitting access to the server computing device over a specific network, receiving, by the mobile computing device, a digital certificate identifying the user of the mobile computing device, the server computing device, a validity period in which the digital certificate is valid, and a list of actions that the user is permitted to perform on the server computing device in accordance with the maintenance during the validity period;

while the mobile computing device is physically proximate to the server computing device sufficient to establish a non-networking connection that does not require the credentialed network access, establishing, by the mobile computing device, the non-networking connection with the server computing device during the validity period;

transmitting, by the mobile computing device, the digital certificate to the server computing device via the non-networking connection; and after the server computing device has authenticated the digital certificate, displaying, by the mobile computing device, the list of actions to the user, the list of actions comprising an action to power off the server computing device;

receiving, by the mobile computing device, a selected action of the list of actions from the user; and transmitting, by the mobile computing device, the selected action to the server computing device for the server computing device to perform in accordance with the maintenance, wherein the server computing device is one of a plurality of server computing devices located within a same server rack and that have disabled power switches to prevent the user from accidentally powering off an incorrect server computing device when the server computing device requires maintenance, wherein the processing maintains security of the server computing device when the server computing device requires the maintenance by the user, by permitting the mobile computing device of the user access to the server computing device when the user has direct physical access to the server computing device and the mobile computing device is physically proximate to the server computing device sufficient to establish the non-networking connection, without providing the credentialed network access to the server computing device without having to temporarily enable the power switch thereof, preventing accidental turning off of the incorrect server computing device while also maintaining network security.

12. The mobile computing device of claim 11, wherein the digital certificate is pre-created by an administrator of the server computing device, the administrator being different than the user of the mobile computing device.

13. The mobile computing device of claim 11, wherein the non-networking connection is one of:
a Bluetooth wireless connection;
a near-field communications (NFC) wireless connection;
a universal serial bus (USB) wired connection.

14. The mobile computing device of claim 11, wherein the non-networking connection is established such that and in that the user is not provided a user account and a password to access the server computing device.

15. The mobile computing device of claim 11, wherein the action to power off the server computing device permits the user to power off the server computing device even when the power switch of the server computing device has been disabled.

\* \* \* \* \*